United States Patent [19]

Akatsuchi et al.

[11] Patent Number: 4,730,996
[45] Date of Patent: Mar. 15, 1988

[54] ROTARY COMPRESSOR WITH TWO DISCHARGE VALVES HAVING DIFFERENT FREQUENCIES

[75] Inventors: Masahiro Akatsuchi, Fuji; Tsugio Itami, Numazu, both of Japan

[73] Assignee: Kabushiki Kaisha Toshiba, Kawasaki, Japan

[21] Appl. No.: 890,336

[22] Filed: Jul. 29, 1986

[30] Foreign Application Priority Data

Jul. 29, 1985 [JP] Japan .................. 60-115075[U]
Jul. 31, 1985 [JP] Japan .................. 60-116496[U]

[51] Int. Cl.[4] .................. F04C 29/06; F16K 15/16; F16K 51/00
[52] U.S. Cl. .................. 418/15; 418/63; 418/181; 418/96; 137/512.1; 137/512.3; 137/856; 417/312
[58] Field of Search .................. 418/15, 63, 181, 270, 418/96; 137/512.1, 512.3, 856; 417/312

[56] References Cited

U.S. PATENT DOCUMENTS 4,195,660 4/1980 Taipale et al. .................. 137/512.3

FOREIGN PATENT DOCUMENTS

| 832763 | 2/1952 | Fed. Rep. of Germany | 418/63 |
| 55-49595 | 4/1980 | Japan | 417/312 |
| 57-153795 | 3/1981 | Japan | . |
| 57-105577 | 7/1982 | Japan | 417/312 |
| 59-200088 | 11/1984 | Japan | 418/15 |
| 60-1396 | 1/1985 | Japan | 418/15 |

Primary Examiner—John J. Vrablik
Attorney, Agent, or Firm—Cushman, Darby & Cushman

[57] ABSTRACT

A rotary compressor includes a compression section disposed in a case. The compression section has a cylinder and first and second bearings fixed on both sides of the cylinder to define a compression chamber together with the cylinder. A first discharge mechanism for discharging a fluid compressed in the compression chamber into the outside of the chamber is provided at the first bearing. A second discharge mechanism for discharging a fluid compressed in the compression chamber into the outside of the chamber is provided at the second bearing. The first mechanism has a first discharge port formed in the first bearing and a first discharge valve for opening and closing the first port. The second mechanism has a second discharge port formed in the second bearing and a second discharge valve for opening and closing the second port with a different frequency from that of the first valve.

7 Claims, 6 Drawing Figures

ROTARY COMPRESSOR WITH TWO DISCHARGE VALVES HAVING DIFFERENT FREQUENCIES

BACKGROUND OF THE INVENTION

This invention relates to a rotary compressor, and more particularly to the type which comprises two discharge mechanisms to draw out a fluid compressed in a compression chamber.

Generally, a compressor comprises an outer casing, a compression section installed in the casing, and a drive section built in the casing to drive the compression section. The compression section and drive section are connected together by a rotary shaft. The compression section is provided with a pair of bearings supporting the rotary shaft and a cylinder interposed between these bearings. A compression chamber is defined by the paired bearings and the inner wall of the cylinder. Each bearing is provided with a discharge port for delivering a fluid compressed in the compression chamber into the outer casing. These ports extend along an axis parallel with the rotary shaft and are concentrically formed. These ports are respectively made to open and close by lead valves fitted to the bearings. To describe in detail, each lead valve is cantilevered on the bearing. The free end of the lead valve cooperates with a valve seat formed on the bearing to open or close the discharge port. The fixed ends of the lead valves are set on a common axis parallel with the rotary shaft. Consequently, the lead valves face each other in parallel, namely, are arranged symmetrical with respect to a plane intersecting the rotary shaft at right angles.

A compressor of the above-mentioned type which is provided with a pair of discharge mechanisms can indeed divide a gas drawn out of the compression chamber into two streams, thus making it possible to reduce the size of the respective discharge mechanism involved even in a compressor having a large discharging capacity. But the conventional compressor has the drawback that noise arising from the paired discharge mechanisms resonates, tending to generate much more noise than a compressor equipped with only one discharge mechanism.

SUMMARY OF THE INVENTION

This invention has been accomplished in view of the above-mentioned circumstances and is intended to provide a low noise rotary compressor, though provided with a pair of discharge mechanisms.

To attain the above-mentioned object, this invention provides a compressor which comprises first and second discharge mechanisms, and wherein the second discharge mechanism is so designed as to open and close a discharge valve with a different number of frequencies from that of the frequencies of the discharge valve of the first discharge mechanism.

BRIEF DESCRIPTION OF THE DRAWINGS

FIGS. 1 to 5 show a rotary compressor according to an embodiment of the present invention in which;

FIG. 1 is a sectional view of the compressor,

FIG. 2 is a sectional view taken along line II—II of FIG. 1,

FIG. 3 is a sectional view taken along line III—III of FIG. 2,

FIG. 4 is a plan view of a main bearing, and

FIG. 5 is a plan view of an auxiliary bearing; and

DETAILED DESCRIPTION OF THE PREFERRED EMBODIMENT

Description may now be made with reference to the accompanying drawings of a rotary compressor embodying this invention.

Figure 1:
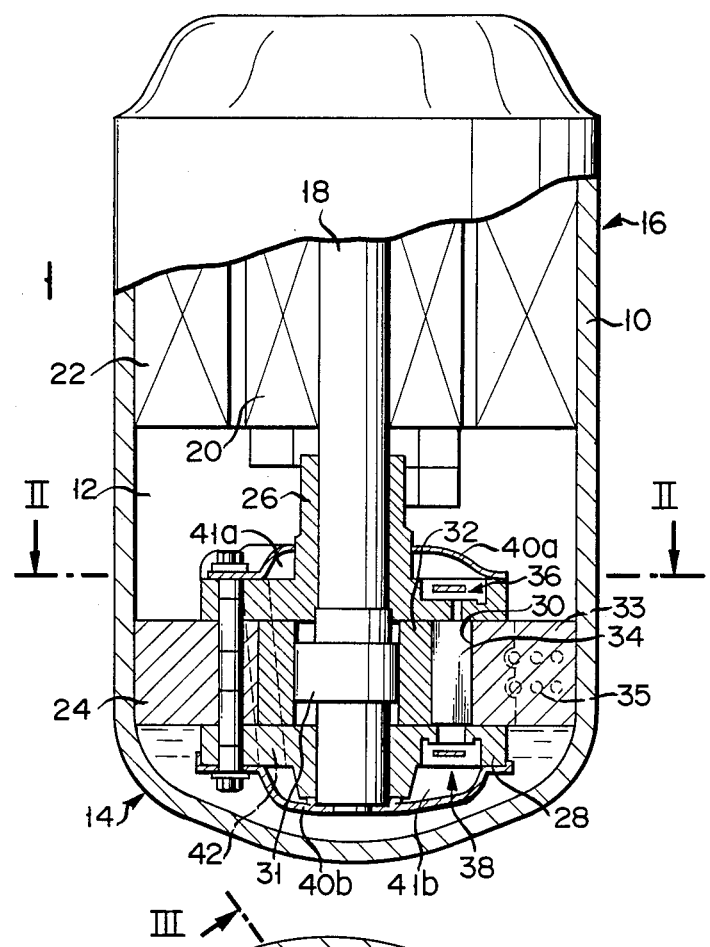

FIG. 1 shows a rotary compressor embodying this invention. The compressor has hermetically sealed case 10, whose interior defines accumulation chamber 12. Compression section 14 is arranged in the lower part of chamber 12. Drive section 16 is provided in the upper part of chamber 12. Drive section 16 comprises vertically extending rotary shaft 18, rotor 20 fixed around the upper peripheral wall of rotary shaft 18, and stator 22 fixed to the inner wall of case 10 and so positioned as to face the outer periphery of rotor 20.

Compression section 14 comprises cylinder 24 fixed to the inner wall of case 10 in a concentrical relationship with rotary shaft 18. The lower end portion of rotary shaft 18 penetrates the inner hole of cylinder 24. Main bearing 26 is fixed to the upper end face of cylinder 24, and auxiliary bearing 28 is set on the lower end face of cylinder 24. Compression chamber 30 is defined by bearings 26, 28 and the inner peripheral surface of cylinder 24. Provided in compression chamber 30 are eccentric cam 31 fixed to rotary shaft 18 and roller 32 engaged with the outer peripheral wall of cam 31. As rotary shaft 18 rotates, roller 32 rolls over the inner peripheral surface of cylinder 24, thereby compressing a fluid drawn into compression chamber 30. Cylinder 24 is provided with guide groove 33 extending along the diameter of cylinder 24. Blade 34 is slidably provided in guide groove 33. Blade 34 is urged inward of spring 35 built in guide groove 33, and the distal end of blade 34 elastically contacts the outer peripheral surface of roller 32. Compression chamber 30 is divided into a high-pressure compartment and a low-pressure compartment by means of blade 34.

First and second discharge mechanisms 36, 38 are respectively provided on main bearing 26 and auxiliary bearing 28 in order to draw a fluid, for example, cooling gas compressed in compression chamber 30 into accumulation chamber 12 when the gas reaches a higher pressure than the predetermined level. First muffler cover 40a is provided on the upper surface of main bearing 26 to cover first discharge mechanism 36. Cover 40a defines discharge chamber 41a. Fixed to auxiliary bearing 28 is second muffler cover 40b to close second discharge mechanism 38. Cover 40b defines discharge chamber 41b. Discharge chamber 41a communicates with accumulation chamber 12 through a discharge port formed in first muffler cover 40a. Discharge chamber 41b communicates with chamber 41a through passage 42 extending through auxiliary bearing 28, cylinder 24, and main bearing 26. Oil is stored at the bottom of case 10. The lower end of compression section 14 is immersed in the oil.

Figure 2:
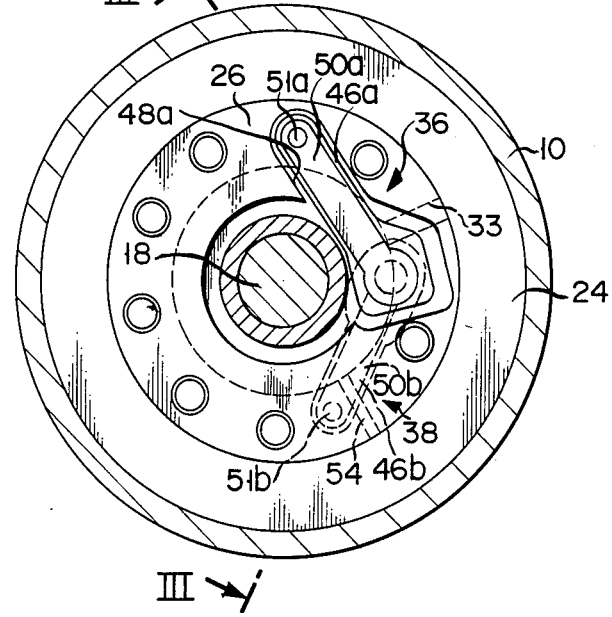
Figure 3:
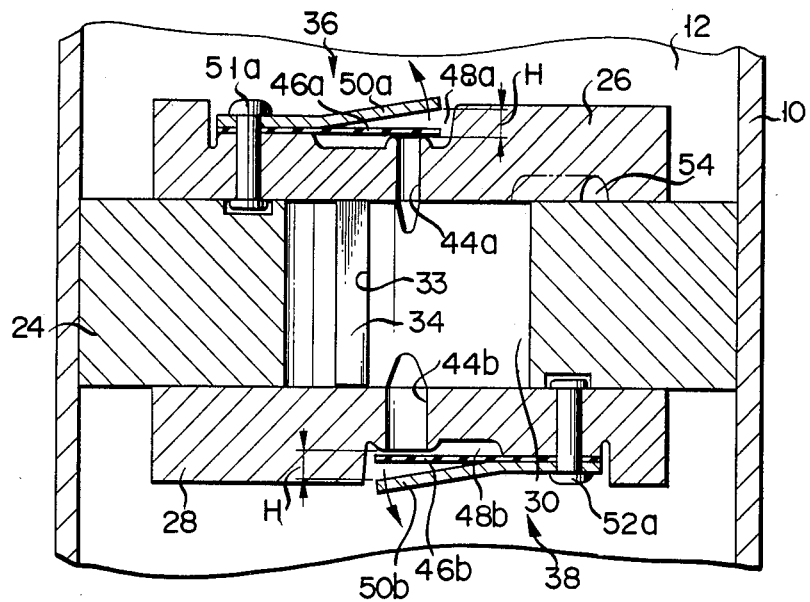

As seen from FIGS. 1 to 3, first discharge mechanism 36 includes first discharge port 44a formed in main bearing 26 and lead valve 46a for opening and closing port 44a. This port 44a extends in parallel with rotary shaft 18, and causes the high-pressure compartment of compression chamber 30 and discharge chamber 41a to communicate with each other. Formed in main bearing 26 is groove 48a to receive lead valve 46a. One end of discharge port 44a is open to the bottom of groove 48a. Lead valve 46a is formed of a flat plate member. One end of lead valve 46a is fixed to bearing 26, and the other free end of valve 46a is used to open and shut discharge port 44a. Discharge mechanism 36 is provided with a stopper 50a to define the maximum opening of lead valve 46a to level H. Stopper 50a is formed of a plate having substantially the same length as lead valve 46a. One end of stopper 50a and the fixed end of lead valve 46a are fixed to main bearing 26 by means of rivet 51a. Stopper 50a extends obliquely upward from the bottom of receiving groove 48a, and faces lead valve 46a at the predetermined interval.

Second discharge mechanism 38 has the same structure as first discharge mechanism 36. Namely, second discharge mechanism 38 includes second discharge port 44b formed in auxiliary bearing 28, lead valve 46b for opening and closing port 44b and stopper 50b for defining the maximum opening of the lead valve 46b to the level H. The second discharge port 44b is formed concentrically with first discharge port 44a and effects communication between the high-pressure compartment of the compression chamber 30 and discharge chamber 41b. Discharge port 44b has a larger cross sectional area than first discharge port 44a. The cross sectional area of discharge port 44b is preferred to be over one and a half times larger than that of discharge port 44a. Discharge port 44b is open at one end to groove 48b formed in auxiliary bearing 28. Lead valve 46b and stopper 50b are fixed at one end to auxiliary bearing 28 by rivet 52a.

Figure 4:
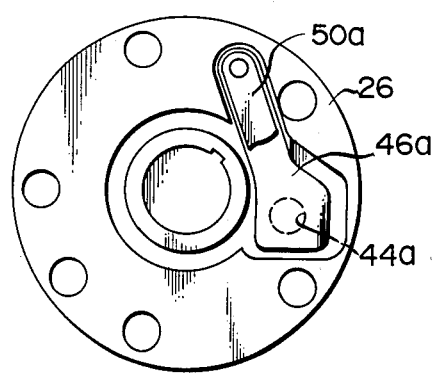
Figure 5:
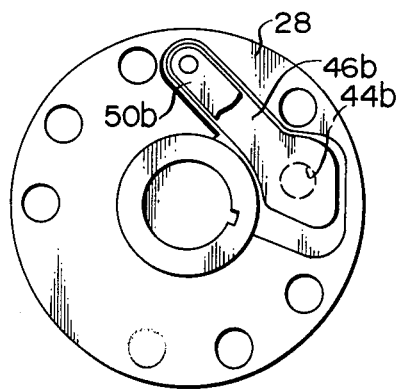

The fixed ends of lead valve 46a and lead valve 46b, namely, rivets 51a, 51b are not coaxially positioned but are positioned at different points in a direction perpendicularly intersecting the axial line of cylinder 24. As best shown in FIG. 2, the fixed ends of lead valves 46a, 46b are set on the opposite sides of a plane involving the central axes of discharge ports 44a, 44b and the central axis of rotary shaft 18. According to the embodiment of the present invention, first lead valve 46a is positioned above blade 34. As seen from FIGS. 4 and 5, lead valves 46a, 46b have different shapes.

As shown in FIGS. 2 and 3, injection port 54 formed in main bearing device 26 extends in such a direction as does not intersect groove 48. Injection port 54 is open at one end to the high-pressure compartment of compression chamber 30, and communicates at the other end with an injection pipe (not shown) which extends out of case 10. When the above-mentioned rotary compressor embodying this invention is applied to a refrigeration cycle, part of a condensed cooling medium is taken into compression chamber 30 through the injection pipe and injection port 54.

The operation of the rotary compressor having the above construction will be described.

When rotary shaft 18 is rotated by drive section 16, roller 32 rolls over the inner peripheral wall of cylinder 24 counterclockwise of FIG. 2. As a result, cooling gas is taken into compression chamber 30 through suction port (not shown) to be compressed therein. When the pressure of cooling gas rises above the predetermined level, the pressure causes first and second lead valves 46a, 46b to be opened. As a result, the cooling gas held in compression chamber 30 is drawn off from first and second discharge ports 44a, 44b. The cooling gas taken out of first discharge port 44a has its sound hushed in discharge chamber 41a and then is carried into accumulation chamber 12. The cooling gas drawn off from second discharge port 44b has its sound hushed in discharge chamber 41b and is taken into accumulation chamber 12 through passage 42 and discharge chamber 41a. Discharge chamber 41b defined by cover 40b is immersed in the oil collected at the bottom of case 10, and passage 42 is relatively long. Thus, the cooling gas has its sound fully hushed in discharge chamber 41b and passage 42. The opening rates of lead valves 46a, and 46b are respectively defined by stoppers 50a, 50b. Lead valves 46a, 46b are automatically closed by a pressure drop in compression chamber 30.

The rotary compressor arranged as described above offers the undermentioned advantages. Discharge ports 44a, 44b have different cross sectional areas. During the operation of the subject compressor, therefore, lead valves 46a and 46b are opened and closed with different frequencies. Consequently, noises arising from lead valves 46a, 46b have different frequency zones, and are prevented from becoming noticeable due to resonation which might otherwise take place. Moreover, both lead valves 46a, 46b are saved from mutual interference, thus elevating the durability of lead valves 46a, 46b and the reliability of the subject rotary compressor.

Figure 6:
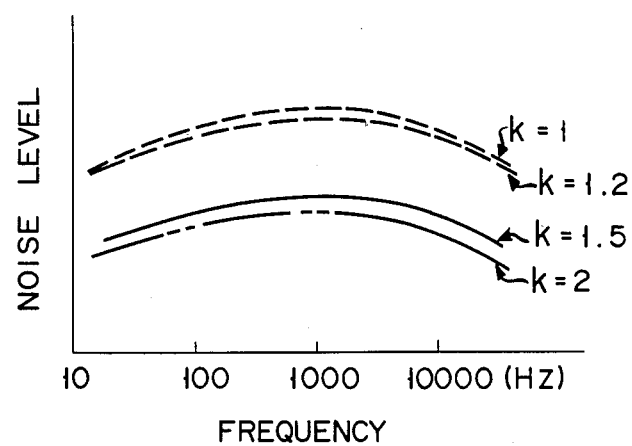
FIG. 6 diagrammatically shows relationships between the levels of noises sent forth from the above-mentioned compressor and the frequency zones.

FIG. 6 diagrammatically indicates the relationship between the noise level of the compressor and the frequency zones of the noises in accordance with the ratio ($K = B/A$) between cross sectional area A of first discharge port 44a and cross sectional area B of second discharge port 44b. FIG. 6 clearly shows that when ratio K between both cross sectional areas rises above 1.5, then noise levels noticeably drop over all the frequency zones. Further, second discharge port 44b has a larger cross sectional area than first discharge port 44a, and causes a larger amount of cooling gas to be drawn off from second discharge port 44b than from first discharge port 44a. As mentioned above, therefore, a large volume of cooling gas is drawn into discharge chamber 41b which has a greater sound-hushing capacity. Consequently noise occurring during the operation of the subject compressor can be effectively suppressed.

According to the embodiment of the present invention, the fixed ends of lead valves 46a, 46b are not positioned on the same axis, but are displaced from each other. Namely, lead valves 46a, 46b extend in the different directions with respect to the axis of discharge ports 44a, 44b. Therefore lead valves 46a, 46b vibrate under different conditions, so that variations appear in the frequency zones of noises arising from said lead valves 46a, 46b, thus more effectively suppressing the rise of the noise level which might otherwise result from resonance.

The thin-walled portions of bearing 26, 28 which result from the formation of grooves 48a, 48b therein tend to be deformed due to the bolting force applied in the assembly of compression section 14 and the pressure prevailing in compression chamber 30. In the embodiment of the present invention, however, grooves 48a, 48b are displaced from each other like lead valves 46a, 46b, and overlap each other in the axial direction of cylinder 24 only in the proximity of discharge ports 44a, 44b. Even when, therefore, tightening force and pressure are applied to the bearings 26, 28, the aforementioned thin-walled portions of the bearings 26, 28 are not deformed all at once. Therefore, no local gap arises between the inner wall of compression chamber 30 and roller 32, as well as between roller 32 and blade 34, thereby ensuring the elevation of the efficiency and reliability of the subject rotary compressor Lead valves 46a, 46b arranged as described above offer a broad latitude in designing the shape (dimension) of the lead valves and that of grooves 48a, 48b. Therefore, it is possible to separately design the shape of the lead valves 46a, 46b and grooves 48a, 48b on the side of the main bearing 26 and that of the auxiliary bearing 28, in such a manner that the shapes of the valves and grooves match the respective bearings. In case lead valves 46a, 46b have different shape as in the above embodiment, the valves obviously have different frequency. Thus, noises generated from the lead valves do not resonate with each other, thereby effectively eliminate the noise of the compressor.

It will be noted that this invention is not limited to the above-described embodiment. Obviously, the invention can be practiced with various modifications within the scope and object of the invention. For instance, the embodiment described above has the constructions that (1) discharge ports have different cross sectional areas, (2) the fixed ends of the lead valves are not positioned on the same axis parallel to the axis of the cylinder, and (3) the lead valves have different shapes. Nonetheless, only one or two of these constructions can be used, in which case substantially the same advantages can be achieved. It is possible to prevent coincidence in the frequency numbers of the paired lead valves by displacing first discharge port from second discharge port in place of the concentric placement of discharge ports. Further, it is possible to vary the frequencies of the lead valves by changing the inclination angles of stoppers 50a, 50b, thereby varying the intervals between the lead valves and stoppers.

What is claimed is:

1. A rotary compressor comprising: a case storing lubrication oil therein;
   a compression section including a cylinder arrangned in the case and first and second bearings fixed on both sides of the cylinder to define a compression chamber together with the cylinder, for compressing a fluid taken into the compression chamber;
   a drive section arranged in the case to drive the compression section;
   a first discharge mechanism including a first discharge port formed in the first bearing and a first discharge valve for opening and closing the first discharge port, for discharging a fluid compressed in the compression chamber into the outside of the compression chamber;
   a first muffler cover provided on the first bearing to cover the first discharge mechanism and defining a muffling chamber communicating with the first discharge port;
   a second discharge mechanism which involves a second discharge port formed in the second bearing and a second discharge valve for opening and closing the second discharge port, for discharging fluid compressed in the compression chamber into the outside of the compression chamber, the second discharge port having a cross sectional area at least one and a half times larger than that of the first discharg port; and
   a second muffler cover provided on the second bearing to cover the second discharge mechanism and defining a second muffling chamber communicating with the second discharge port, the second muffler cover being immersed in the lubrication oil, and the compression section having a passage, through which the second muffling chamber communicates with the first muffling chamber.

2. The compressor according to claim 1, wherein said first discharge valve includes a valve body which has a fixed end fixed to the first bearing and a free end used to open and close the first discharge port; and first discharge valve including a valve body which has a fixed end that is fixed to the first bearing and a free used to open and close the first discharge port; said first discharge mechanism being provided with a first stopper for controlling the opening rate of the first discharge valve.

3. The compressor according to claim 1, wherein said first and second discharge ports are concentrically formed.

4. The compressor according to claim 1, wherein said first discharge valve includes a plate valve body which has a fixed end fixed to the first bearing and a free end used to open and close the first discharge port; said second discharge valve includes a plate valve body which has a fixed end fixed to the second bearing and a free end applied to open and close the second discharge port, and said valve bodies having different shapes.

5. The compressor according to claim 1, wherein said first discharge valve includes a plate valve body which has a fixed end fixed to the first bearing and a free end used to open and close the first discharge port; said second discharge valve includes a plate valve body which has a fixed end fixed to the second bearing and a free end used to open and close the second discharge port; and the fixed ends of the valve bodies are displaced from each other in a direction perpendicular to the axial direction of the cylinder.

6. The compressor according to claim 5, wherein said first bearing includes a first groove receiving the first discharge valve and extending along the first discharge valve; said second bearing includes a second groove receiving a second discharge valve and extending along the second discharge valve.

7. The compressor according to claim 6, wherein said first and second discharge ports are concentrically formed.

* * * * *